(12) United States Patent
Domokos et al.

(10) Patent No.: US 10,864,506 B2
(45) Date of Patent: *Dec. 15, 2020

(54) HYDROCARBON CONVERSION CATALYST COMPOSITION

(71) Applicant: SHELL OIL COMPANY, Houston, TX (US)

(72) Inventors: László Domokos, Amsterdam (NL); Laurent Georges Huve, Colombes (FR); Hermanus Jongkind, Amsterdam (NL); Aan Hendrik Klazinga, Hilversum (NL); Marcello Stefano Rigutto, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,027

(22) Filed: Dec. 12, 2019

(65) Prior Publication Data

US 2020/0129968 A1 Apr. 30, 2020

Related U.S. Application Data

(62) Division of application No. 13/881,070, filed as application No. PCT/EP2011/068345 on Oct. 20, 2011, now Pat. No. 10,543,479.

(30) Foreign Application Priority Data

Oct. 25, 2010 (EP) .................................... 10306165

(51) Int. Cl.
| | |
|---|---|
| *C10G 45/64* | (2006.01) |
| *B01J 29/74* | (2006.01) |
| *B01J 29/78* | (2006.01) |
| *B01J 29/76* | (2006.01) |
| *B01J 29/72* | (2006.01) |
| *B01J 37/30* | (2006.01) |
| *B01J 37/00* | (2006.01) |
| *B01J 29/70* | (2006.01) |
| *B01J 35/10* | (2006.01) |
| *B01J 29/80* | (2006.01) |
| *B01J 37/02* | (2006.01) |
| *B01J 23/755* | (2006.01) |
| *C10G 49/08* | (2006.01) |
| *B01J 23/44* | (2006.01) |
| *C10G 35/06* | (2006.01) |
| *B01J 23/42* | (2006.01) |
| *C10G 50/00* | (2006.01) |
| *C10G 45/62* | (2006.01) |
| *C10G 65/04* | (2006.01) |

(Continued)

(52) U.S. Cl.
CPC .......... *B01J 29/7446* (2013.01); *B01J 23/42* (2013.01); *B01J 23/44* (2013.01); *B01J 23/755* (2013.01); *B01J 29/70* (2013.01); *B01J 29/703* (2013.01); *B01J 29/708* (2013.01); *B01J 29/7049* (2013.01); *B01J 29/7261* (2013.01); *B01J 29/7461* (2013.01); *B01J 29/7661* (2013.01); *B01J 29/7861* (2013.01); *B01J 29/80* (2013.01); *B01J 35/10* (2013.01); *B01J 37/0009* (2013.01); *B01J 37/0201* (2013.01); *B01J 37/30* (2013.01); *C10G 35/065* (2013.01); *C10G 45/62* (2013.01); *C10G 45/64* (2013.01); *C10G 47/16* (2013.01); *C10G 47/18* (2013.01); *C10G 47/20* (2013.01); *C10G 49/08* (2013.01); *C10G 50/00* (2013.01); *C10G 65/043* (2013.01); *C10G 65/12* (2013.01); *B01J 2229/16* (2013.01); *B01J 2229/186* (2013.01); *B01J 2229/20* (2013.01); *B01J 2229/32* (2013.01); *B01J 2229/37* (2013.01); *B01J 2229/42* (2013.01); *C10G 2300/107* (2013.01); *C10G 2300/1022* (2013.01); *C10G 2300/1059* (2013.01); *C10G 2300/1062* (2013.01); *C10G 2300/1074* (2013.01); *C10G 2300/1096* (2013.01); *C10G 2300/301* (2013.01); *C10G 2300/304* (2013.01); *C10G 2300/70* (2013.01); *C10G 2400/30* (2013.01)

(58) Field of Classification Search
CPC ........ C10G 45/64; C10G 49/08; C10G 65/12; C10G 50/00; C10G 35/065; C10G 2400/30; C10G 2300/107; C10G 2300/1074; C10G 2300/1059; C10G 2300/1022; C10G 2300/1062; C10G 2300/1096; C10G 2300/70; C10G 2300/301; C10G 2300/304
USPC ........... 208/27, 28, 133, 135, 137, 138, 141; 585/477, 480, 481, 482
See application file for complete search history.

(56) References Cited

U.S. PATENT DOCUMENTS 4,753,910 A * 6/1988 Han .................. B01J 29/06
502/85
5,075,269 A * 12/1991 Degnan .................. B01J 29/703
423/708

(Continued)

FOREIGN PATENT DOCUMENTS

| WO | WO 96/41849 | * | 12/1996 |
| WO | WO 00/29512 | * | 4/2000 |
| WO | WO 2009/016143 | * | 2/2009 |

*Primary Examiner* — Elizabeth D Wood
(74) *Attorney, Agent, or Firm* — Charles W. Stewart

(57) ABSTRACT

A hydrocarbon conversion catalyst composition which comprises ZSM-48 and/or EU-2 zeolite particles and refractory oxide binder essentially free of alumina in which the average aluminium concentration of the ZSM-48 and/or EU-2 zeolite particles is at least 1.3 times the aluminium concentration at the surface of the particles, processes for preparing such catalyst compositions and processes for converting hydrocarbon feedstock with the help of such compositions.

8 Claims, No Drawings

(51) Int. Cl.
*C10G 47/16* (2006.01)
*C10G 47/18* (2006.01)
*C10G 47/20* (2006.01)
*C10G 65/12* (2006.01)

(56) References Cited

U.S. PATENT DOCUMENTS

| | | | | |
|---|---|---|---|---|
| 5,157,191 | A * | 10/1992 | Bowes | B01J 29/40 585/533 |
| 6,576,120 | B1 * | 6/2003 | Van Ballegoy | B01J 29/06 208/108 |
| 9,029,283 | B2 * | 5/2015 | Berg-Slot | B01J 23/626 502/60 |
| 9,764,312 | B2 * | 9/2017 | Geerinck | B01J 29/703 |
| 10,449,525 | B2 * | 10/2019 | Domokos | B01J 29/703 |

* cited by examiner

HYDROCARBON CONVERSION CATALYST COMPOSITION

This application is a divisional application of Ser. No. 13/881,070, filed Jul. 16, 2013, now U.S. Pat. No. 10,543,479, which application was the National Stage of International Application PCT/EP2011/068345, filed Oct. 20, 2011, which claims the benefit of European Patent Application No. 10306165.1, filed Oct. 25, 2010.

The invention relates to hydrocarbon conversion catalyst compositions comprising ZSM-48 and/or EU-2 zeolite, processes for preparing such catalyst compositions and processes for converting hydrocarbon feedstock with the help of such compositions.

It is known from U.S. Pat. Nos. 4,741,891 and 5,075,269 that ZSM-48 and/or EU-2 zeolite are especially suitable for use in hydrocarbon conversion catalysts. As described in the Catalog of Disorder in Zeolite Frameworks published in 2000, both ZSM-48 and EU-2 zeolite belong to the family of ZSM-48 zeolites.

It has now surprisingly been found that a specific kind of ZSM-48 and/or EU-2 zeolites give catalysts showing improved hydrocarbon conversion performance. These catalyst compositions furthermore can be prepared in a simple and effective way using as starting material conventional ZSM-48 and/or EU-2 zeolite. Such zeolites can contain impurities and/or have a relatively high silica to alumina molar ratio. This makes that it is not required to employ pure zeolite as described in WO-A-2005/092792 or zeolite having a reduced silica to alumina molar ratio as described in WO-A-2007/070521.

The present invention relates to a hydrocarbon conversion catalyst composition which comprises ZSM-48 and/or EU-2 zeolite and a refractory oxide binder essentially free of alumina in which the average aluminium concentration of the ZSM-48 and/or EU-2 zeolite particles is at least 1.3 times the aluminium concentration at the surface of the particles.

European application 10306165.1 filed on 25 Oct. 2010 describes general dealumination of ZSM-48 and/or EU-2 zeolite.

ZSM-48 and/or EU-2 for use in the present invention can be prepared by dealumination which selectively removes aluminium from the surface of the zeolite particles.

For the aluminium concentration both aluminium per se and aluminium containing compounds such as alumina are to be take into account.

The dealumination process can be carried out either on the zeolite per se or on a mixture of zeolite and binder. The average aluminium concentration is at least 1.1 times the aluminium concentration at the surface, preferably at least 1.2, more specifically at least 1.3, more specifically at least 1.4, more specifically at least 1.5, more specifically at least 1.6, more specifically at least 1.7, more specifically at least 1.8, most preferably at least 2 times the aluminium concentration at the surface.

The average aluminium concentration can be determined by any one of a number of chemical analysis techniques. Such techniques include X-ray fluorescence, atomic adsorption and inductive coupled plasma-atomic emission spectroscopy (ICP-AES). For the present invention, the average aluminium concentration is to be determined by X-ray fluorescence.

The aluminium concentration at the surface can be determined by any method known to those skilled in the art such as by secondary ion mass spectrometry (SIMS) or by X-ray photoelectron spectroscopy (XPS). For the present invention, XPS is to be used.

Dealumination processes for preparing zeolites for use in the present invention, are well known in the art. For the present invention, it is preferred to choose a dealumination process from the group consisting of treating the zeolite particles with an acid which cannot enter the pores of the zeolite such as a bulky organic acid and treating the zeolite particles with a fluor containing salt.

Preferably, the acid for use in dealumination is an organic acid comprising at least 2 carbon atoms, more preferably of from 2 to 6 carbon atoms. Most preferably, the organic acid comprises 2 carboxy groups. Most preferably, the organic acid is oxalic acid. Contacting is preferably carried out at a temperature of from 10 to 100° C. during of from 1 to 10 hours. The organic acid preferably is an aqueous solution containing of from 0.01 to 1 mole organic acid/liter. The zeolite preferably is treated with such organic acid in a weight ratio of from 2:1 to 1:30 of zeolite to organic acid solution.

Most preferably, the dealumination is performed by a process in which the zeolite is contacted with a solution of a fluor containing salt, such as ammonium fluoride, more specifically a compound chosen from the group consisting of fluorosilicates and fluorotitanates. These processes are described in more detail in U.S. Pat. No. 4,753,910. Most preferably, the dealumination process comprises contacting the zeolite with a solution of a fluorosilicate salt wherein the fluorosilicate salt is represented by the formula:

$$(A)_{2/b}/SiF_6$$

wherein 'A' is a metallic or non-metallic cation other than H+ having the valence 'b'. Examples of cations 'b' are alkylammonium, $NH_4^+$, $Mg^{++}$, $Li^+$, $Na^+$, $K^+$, $Ba^{++}$, $Cd^{++}$, $Cu^+$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$, and $Zn^{++}$. Preferably 'A' is the ammonium cation.

The solution comprising the fluorosilicate salt preferably is an aqueous solution. The concentration of the salt preferably is at least 0.005 mole of fluorosilicate salt/l, more preferably at least 0.007, most preferably at least 0.01 mole of fluorosilicate salt/l. The concentration preferably is at most 0.5 mole of fluorosilicate salt/l, more preferably at most 0.3, most preferably at most 0.1 of fluorosilicate salt/l. Preferably, the weight ratio of fluorosilicate salt solution to zeolite is from 50:1 to 1:4 of fluorosilicate solution to zeolite. If the zeolite is present together with binder, the binder is not taken into account for these weight ratios.

The pH of the aqueous fluorosilicate containing solution preferably is between 2 and 8, more preferably between 3 and 7.

The zeolite material preferably is contacted with the fluorosilicate salt solution for of from 0.5 to 20 hours, more specifically of from 1 to 10 hours. The temperature preferably is of from 10 to 120° C., more specifically of from 20 to 100° C. The amount of fluorosilicate salt preferably is at least 0.002 moles of fluorosilicate salt per 100 grams of total amount of ZSM-48 and EU-2 zeolite, more specifically at least 0.003, more specifically at least 0.004, more specifically at least 0.005 moles of fluorosilicate salt per 100 grams of total amount of ZSM-48 and EU-2 zeolite. The amount preferably is at most 0.5 moles of fluorosilicate salt per 100 grams of total amount of ZSM-48 and EU-2 zeolite, more preferably at most 0.3, more preferably at most 0.1 moles of fluorosilicate salt per 100 grams of total amount of ZSM-48 and EU-2 zeolite. If the zeolite is present together with binder, the binder is not taken into account for these weight ratios.

The ZSM-48 and EU-2 zeolite can be dealuminated as zeolite powder. However, it is preferred that the ZSM-48 and/or EU-2 zeolite is dealuminated in admixture with the refractory oxide binder, more specifically as part of extrudates. This makes that the zeolite can be handled more easily while the presence of binder has not led to any disadvantageous side-effects.

In the present invention, the reference to ZSM-48 and EU-2 zeolite is used to indicate that all zeolites can be used that belong to the ZSM-48 family of disordered structures also referred to as the *MRE family and described in the Catalog of Disorder in Zeolite Frameworks published in 2000 on behalf of the Structure Commission of the International Zeolite Association. Even if EU-2 would be considered to be different from ZSM-48, both ZSM-48 and EU-2 can be used in the present invention. Zeolites ZBM-30 and EU-11 resemble ZSM-48 closely and also are considered to be members of the zeolites whose structure belongs to the ZSM-48 family. In the present application, any reference to ZSM-48 zeolite also is a reference to ZBM-30 and EU-11 zeolite.

Besides ZSM-48 and/or EU-2 zeolite, further zeolites can be present in the catalyst composition especially if it is desired to modify its catalytic properties. It has been found that it can be advantageous to have present zeolite ZSM-12 which zeolite has been defined in the Database of Zeolite Structures published in 2007/2008 on behalf of the Structure Commission of the International Zeolite Association.

The silica to alumina molar ratio of the ZSM-48 and/or EU-2 zeolite can influence the properties of the catalyst derived from it. The silica to alumina molar ratio ("SAR") is to be determined by bulk ratio. This ratio is also referred to as the overall ratio. Such ratio is different from the SAR of the crystalline framework. The bulk or overall ratio can be determined by any one of a number of chemical analysis techniques. Such techniques include X-ray fluorescence, atomic adsorption, and inductive coupled plasma-atomic emission spectroscopy (ICP-AES). All will provide substantially the same bulk ratio value. The silica to alumina molar ratio for use in the present invention is determined by X-ray fluorescence.

The SAR of the ZSM-48 and/or EU-2 zeolite preferably is at least 50, more specifically at least 70, more specifically at least 100, most preferably at least 150. The SAR of the ZSM-48 and/or EU-2 zeolite preferably is at most 300, more specifically at most 250, more specifically at most 230, most specifically at most 210.

The ZSM-48 and/or EU-2 zeolite can be prepared in any way known to someone skilled in the art. U.S. Pat. Nos. 5,075,269 and 4,741,891 describe suitable manufacturing methods for zeolite having a SAR of from 100 to 250.

When contents of binder and zeolite are used in the context of the present invention, the content on a dry basis is meant. The catalyst composition of the present invention preferably comprises at most 70% by weight (% wt) of zeolite, more specifically at most 65% wt, more specifically at most 60% wt, preferably at most 58% wt, most preferably at most 55% wt. These amounts preferably apply to the ZSM-48 and/or EU-2 zeolite. Further, it is preferred that the amount of ZSM-48 and/or EU-2 zeolite is at least 15% wt, more specifically at least 20% wt, more specifically at least 25% wt, most specifically at least 30% wt. If further zeolite is present besides the ZSM-48 and/or EU-2 zeolite, such zeolite preferably is present in an amount of at most 50% wt, based on amount of ZSM-48 and EU-2 zeolite which is present.

Examples of refractory oxide binder material which is essentially free of alumina are silica, zirconia, titanium dioxide, germanium dioxide, boria and mixtures of two or more of these like for example silica-zirconia and silica-titania. The binder preferably has low acidity as low acidity refractory oxide binders, preferably titania, zirconia and/or silica, tend not to interact with the zeolite. Consequently, zeolites can be bound with low acidity refractory oxides without influencing the zeolites' intrinsic activity as might occur with an acid binder such as alumina. Preferred low acidity refractory oxide binders are silica and/or titania. Although it is not desirable to have a high amount of alumina present, a certain amount of alumina can be present without immediate disadvantageous effects. In the present description, the expression essentially free of alumina indicates that at most a limited amount of alumina is to be present. The amount of alumina present in the binder, on a dry weight basis, preferably is at most 2% wt, more specifically at most 1.1% wt, more specifically at most 0.8% wt, more specifically at most 0.5% wt, more specifically at most 0.3% wt, most specifically at most 0.2% wt on basis of the binder per se.

The catalyst composition according to the present invention is preferably manufactured by preparing an extrudable mass comprising binder and ZSM-48 and/or EU-2 zeolite. This extrudable mass should have a sufficient viscosity in order to be extruded into shapes. One skilled in the art will know how to achieve such a paste like mixture. Preferably the water content of the extrudable mass does not exceed 60%, and preferably is at least 35% by weight.

If the binder is silica, it is preferred to use both silica sol and silica powder as silica source in the preparation of the composition. The silica sol can be either acidic or basic.

To obtain strong catalyst compositions, it is preferred to maximise the amount of silica sol used relative the amount of silica powder used, while still achieving a sufficient viscosity of the extrudable mass. The optimal amount of silica powder to be used will depend on the zeolite content, wherein at a low zeolite content of the catalyst, more silica powder will have to be used. One skilled in the art can easily determine the optimal composition in view of the above teaching. The silica powder may be commercially obtained silica powder, for example Sipernat 22 or 50 (as obtained from Degussa AG), Nasilco Ultrasil VN3SP or HiSil 233 EP from PPG Industries. The solid silica powder particles preferably have a mean diameter of between 10 μm and 200 μm.

Optionally a plasticising agent is added to the extrudable mass, preferably shortly before actual extrusion. The plasticiser agent is used to increase the viscosity of the mixture in order to obtain an extrudable mass. Suitable plasticising agents are for example dextrose, gelatine, glucose, glues, gums, salts, waxes, starch and cellulose ethers. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co.

The extrusion may be performed by any of the well known extrusion processes. Examples of such methods are extrusion performed by a screw extruder, a plate or ram extruder. The extrudates can have a wide variety of forms and sizes.

After extrusion, the extrudates obtained are preferably subjected to drying and calcining before subjecting them to dealumination. Drying preferably takes place at a temperature of from 60° C. to 250° C., for a time sufficient to dry the extrudate, for example, for at least 1 hour. Calcining preferably takes place in air, or other inert gas, at temperatures ranging from 250° C. to 850° C. for periods of time ranging, for example, from 1 to 48 hours or more.

The thus obtained extrudates can be subjected to dealumination as described above. After dealumination, the deluminated extrudates and binder preferably are dried for a period of from 0.5 to 10 hours at a temperature of from 50 to 300° C., more specifically of from 80 to 200° C., followed by calcination for a period of from 0.2 to 5 hours at a temperature of from 200 to 650° C., more specifically of from 350 to 600° C.

For most hydrocarbon conversion applications, one or more catalytic metals are to be incorporated into the catalyst compositions in order to make these suitable as catalysts. These catalytic metals can be incorporated in any way known to someone skilled in the art such as ion exchange. Typical ion-exchange techniques involve contacting the catalyst composition with a salt of the desired replacing ion. This can be done by for example pore volume impregnation or continuous solution impregnation. Representative ion-exchange techniques are disclosed in a wide variety of patent specifications including U.S. Pat. Nos. 3,140,249, 3,140,251 and 3,140,253. Preferably, the catalytic metals are incorporated by pore volume impregnation.

Preferably, the catalytic metals are chosen from the group consisting of metals of Groups IIA, IIB and VIII of the Periodic Table of the Elements as shown in the Handbook of Chemistry and Physics, $63^{rd}$ edition 1983, more specifically platinum, palladium, cobalt, molybdenum, iron, tungsten and nickel. Most preferably, the one or more catalytic metals are chosen from the group consisting of platinum, palladium and nickel.

Following contact with a solution of the desired replacing ion, the catalyst composition is then preferably washed with water, and dried and calcined as described above.

The catalyst prepared by the method of this invention can find utility in a wide variety of hydrocarbon conversion processes such as hydrocracking, isomerization, hydrogenation, dehydrogenation, polymerization, reforming, catalytic hydrocracking, toluene disproportionation, and ethylbenzene conversion. The compositions of this invention can be used with or without added active metal components. Catalysts prepared by the process according the invention advantageously can be used as dewaxing catalyst under well known catalytic dewaxing conditions or in alkylaromatics isomerisation for preparing a product of increased xylene content, more specifically para-xylene content. The catalyst can also be used as part of a hydrocracker process which comprises hydrotreating followed by hydrocracking in which the lube base oil is dewaxed.

The catalysts are especially suitable for use in increasing the xylenes content, more specifically the para-xylenes content, of a hydrocarbon fraction containing aromatic hydrocarbons having 8 carbon atoms. The hydrocarbon stream preferably contains at most 60 wt % of ethylbenzene, more specifically at most 50% wt. Preferably, the hydrocarbon stream comprises at least 5% wt, more specifically at least 8% wt, preferably at least 10% wt, most preferably at least 15 wt % of ethylbenzene. The hydrocarbon stream preferably is contacted with the catalyst at a temperature in the range of from 300 to 450° C., preferably at least 350° C. and preferably at most 400° C.

Most preferably, the catalyst of the present invention is used in dewaxing. Catalytic dewaxing is used to improve cold flow properties of diesel fuels and lube oils by selective hydroisomerization/hydrocracking of normal and slightly branched paraffins. The dewaxing process reduces the pour point of the feedstock preferably by at least 10° C., more preferably by at least 20° C. The current catalysts can be used for conventional diesel fuels dewaxing to deep dewaxing (Artic grade production) in first and second stage applications, in combination with high pressure hydrocracking or mild hydrocracking catalyst package, in mild hydrocracker bottoms pour point reduction for storage and transportation and/or to produce lubes of exceptional quality.

Suitable hydrocarbon oil feeds to be employed in the process according to the present invention are mixtures of high-boiling hydrocarbons, such as, for instance, heavy oil fractions. It has been found particularly suitable to use vacuum distillate fractions derived from an atmospheric residue, i.e. distillate fractions obtained by vacuum distillation of a residual fraction which in return is obtained by atmospheric distillation of a crude oil, as the feed. The boiling range of such a vacuum distillate fraction is usually between 300 and 620° C., suitably between 350 and 580° C. However, deasphalted residual oil fractions, including both deasphalted atmospheric residues and deasphalted vacuum residues, may also be applied. If the vacuum distillate fractions contain substantial amounts of sulphur- and nitrogen-containing contaminants, for example, having sulphur levels up to 3% by weight and nitrogen levels up to 1% by weight, it may be advantageous to treat this feedstock to a hydrodesulphurisation and hydrodenitrogenation step prior to the catalytic dewaxing process according to the present invention.

Dewaxing generally comprises contacting feedstock with a catalyst according to the present invention at a temperature of up to 450° C., more specifically of from 250 to 400° C., preferably of from 275 to 350° C., and a total pressure of from 5 to $200 \times 10^5$ Pa, more specifically of from 15 to $170 \times 10^5$ Pa, preferably of from 25 to $150 \times 10^5$ Pa. The liquid hourly space velocity preferably is in the range of from 0.1 to 10 $h^{-1}$.

The feedstock to be subjected to dewaxing preferably is a gas oil or a lube oil basestock. The feedstock preferably is a lube oil base stock. The feedstocks preferably are wax-containing feeds that boil in the lubricating oil range typically having a 10% distillation point at 200° C. or higher as measured by ASTM D-2887. Examples of feeds having relatively high amounts of waxy compounds are synthetic waxy raffinates (Fischer-Tropsch waxy raffinates), hydrocracker bottom fractions (hydrowax), i.e. those fractions having a final boiling point of at least 320° C., preferably at least 360° C. and slack waxes obtained from the dewaxing of hydroprocessed or solvent refilled waxy distillates. These feeds have a wax content of at least 50% by weight, preferably at least 80% by weight and more preferably at least 90% by weight. Wax are compounds which are plastic at ambient temperature and melt above 45° C. to give a low viscosity liquid. The amount of wax can be determined by the ASTM method D3235.

The process of the present invention can be used to prepare lubricating base oils having viscosity indices (VI) above 120 and particularly above 135.

Furthermore, the feedstocks may have been hydrotreated and/or hydrocracked before being subjected to dewaxing.

Hydrotreating generally involves contacting feedstock with a hydrotreating catalyst at a temperature of up to 500°

C., more specifically of from 250 to 500° C., and a hydrogen partial pressure of from 10 to $200 \times 10^5$ Pa, more specifically of from 30 to $130 \times 10^5$ Pa.

Hydrocracking generally involves contacting feedstock with a hydrocracking catalyst at a hydrogen partial pressure (at the reactor inlet) in the range from $3 \times 10^6$ to $2.9 \times 10^7$ Pa, more preferably from $8 \times 10^6$ to $1.75 \times 10^7$ Pa and a ratio of hydrogen gas to feedstock (total gas rate) in the range from 100 to 5000 Nl/kg, but preferably in the range from 200 to 3000 Nl/kg.

That which is claimed:

1. A hydrocarbon conversion process, comprising:
   contacting a hydrocarbon feedstock, having a 10% distillation point of 200° C. or higher, with a hydrocarbon conversion catalyst under hydrocarbon conversion conditions, including a contacting temperature in the range of from 100 to 600° C. and a contacting pressure in the range of from 1 to 100 bara;
   wherein said hydrocarbon conversion catalyst comprises a dealuminated extrudate and a catalytic metal selected from the group consisting of platinum, palladium, and nickel; wherein said dealuminated extrudate includes an extrudate comprising ZSM-48 and/or EU-2 zeolite particles present in an amount to provide a zeolite content of said hydrocarbon conversion catalyst composition of at least 20 wt % and at most 70 wt % and silica binder that includes both silica sol and silica powder containing silica particles having a mean diameter between 10 μm and 200 μm, and wherein said ZSM-48 and/or EU-2 zeolite particles in said extrudate before its dealumination have a bulk silica-to-alumina molar ratio (SAR) of at least 150 and at most 210, and wherein said silica binder is essentially free of alumina; and, wherein said extrudate is dealuminated after being dried and calcined to provide said dealuminated extrudate that is followed by incorporation of said catalytic metal into said dealuminated extrudate; and wherein the average aluminium concentration of the ZSM-48 and/or EU-2 zeolite particles is at least 1.1 times the aluminium concentration at the surface of the particles; and
   yielding a hydrocarbon feedstock conversion product.

2. A hydrocarbon conversion process as recited in claim 1, wherein said hydrocarbon feedstock has a 10% distillation point greater than 343° C. measured by ASTM D 86.

3. A hydrocarbon conversion process as recited in claim 1, wherein said hydrocarbon conversion conditions include a contacting temperature in the range of from 250 to 400° C. and a contacting pressure in the range of from $5 \times 10^5$ Pa to $200 \times 10^5$ Pa and a liquid hourly space velocity in the range of from 0.1 to 10 hr$^{-1}$.

4. A hydrocarbon conversion process as recited in claim 3, wherein the zeolite content of the hydrocarbon conversion catalyst composition, on a dry basis, is in the range of from 25 to 65 wt %, as calculated on the total hydrocarbon conversion catalyst composition.

5. A hydrocarbon conversion process as recited in claim 4, wherein the average aluminium concentration of said ZSM-48 and/or EU-2 zeolite particles is at least 1.2 times the aluminium concentration at the surface of the particle.

6. A hydrocarbon conversion process as recited in claim 5, wherein the zeolite content, on a dry basis, is of from 30 to 60 wt % as calculated on the total hydrocarbon conversion catalyst composition.

7. A hydrocarbon conversion process as recited in claim 6, further comprising zeolite ZSM-12, wherein the zeolite ZSM-12 content in the hydrocarbon conversion catalyst composition is an amount of at most 50% wt based on the ZSM-48 and/or EU-2 zeolite present in the hydrocarbon conversion catalyst composition, and wherein the average aluminum concentration of the ZSM-48 and/or EU-2 zeolite particles is at least 1.5 times the aluminium concentration at the surface of the particle.

8. A hydrocarbon conversion process as recited in claim 7, wherein the average aluminium concentration of said ZSM-48 and/or EU-2 zeolite particles is at least 2 times the aluminium concentration at the surface of the particle.

* * * * *